May 20, 1952 J. B. SWAIN 2,597,544
LAUNDRY CART FOR HOUSEHOLD USE
Filed June 27, 1950

Julian Bailey Swain
INVENTOR.

Patented May 20, 1952

2,597,544

UNITED STATES PATENT OFFICE 2,597,544

LAUNDRY CART FOR HOUSEHOLD USE

Julian Bailey Swain, Louisville, Miss.

Application June 27, 1950, Serial No. 170,524

2 Claims. (Cl. 280—51)

The present invention relates to certain new and useful improvements in vehicles and conveyances expressly adapted for assisting one in attending to household chores and has more particular reference to a practical two-wheeled cart which lends itself admirably well in transporting one's wash from the washing machine to the yard for drying and from the yard to the washroom for ironing.

Others than myself have encountered the problem of laboriously tugging and carrying damp, heavy articles from place to place and, for such reason, laundry carts, so-called, are not broadly new. The object of the instant invention is to aptly and satisfactorily cope with the situation and, in so doing, to offer for adoption and use a specially constructed cart in which manufacturers, users and others will find their essential needs and requirements fully met, contained and amply available.

In carrying out the invention, a simple and practical two-wheeled frame is employed as an easily maneuverable vehicle. A clothes-basket or equivalent receptacle is supported removably on one side of the vehicle frame, and a clothespin container or receptacle is supported on the opposite side of the vehicle frame. Using a single, properly centered, vertical leg and attaching same to the vehicle frame and properly bracing it for stability, a construction is had which may be employed with requisite convenience and adaptability to aptly satisfy the requirements of the laundress.

Briefly summarized and somewhat more specifically defined, the aforementioned simple wheel-supported vehicle frame is actually provided on its front with frame means in which the principal clothes receptacle or basket is removably held. Smaller frame means is provided on the rear and this takes care of an insertable and removable receptacle for clothespins. The vertical prop or leg is rigidly secured to the front frame means and is joined by a horizontal brace to the central portion of the wheel accommodating axle. What with the parts carefully chosen and structurally coordinated, an efficient cart for the special purposes intended is thus had.

Other objects and advantages will become more readily apparent from the following description and the accompanying illustrative drawing.

Figure 1:
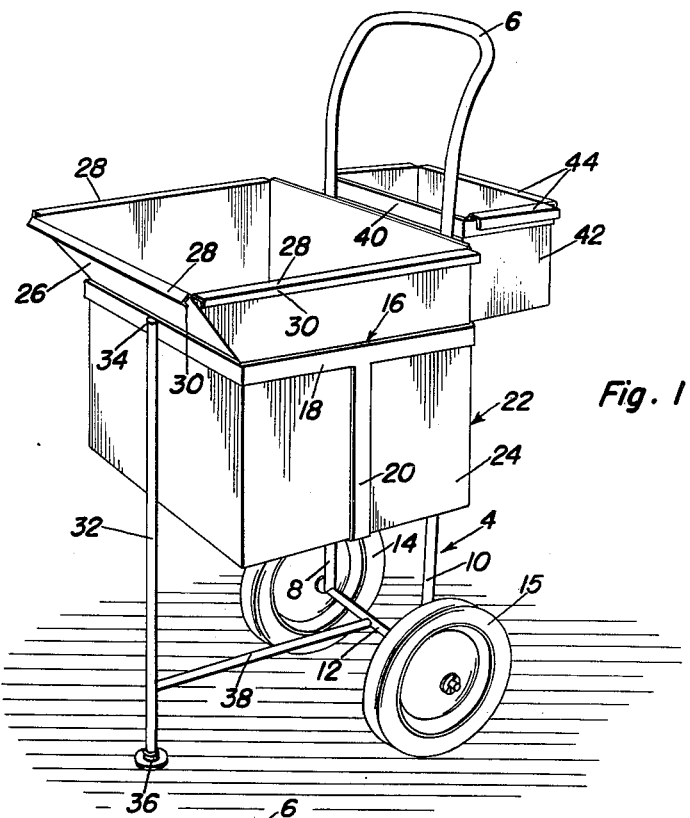
Figure 1 is a perspective view of a laundry handling and transporting cart constructed in accordance with the principles of the present invention.
Figures 2, 3:
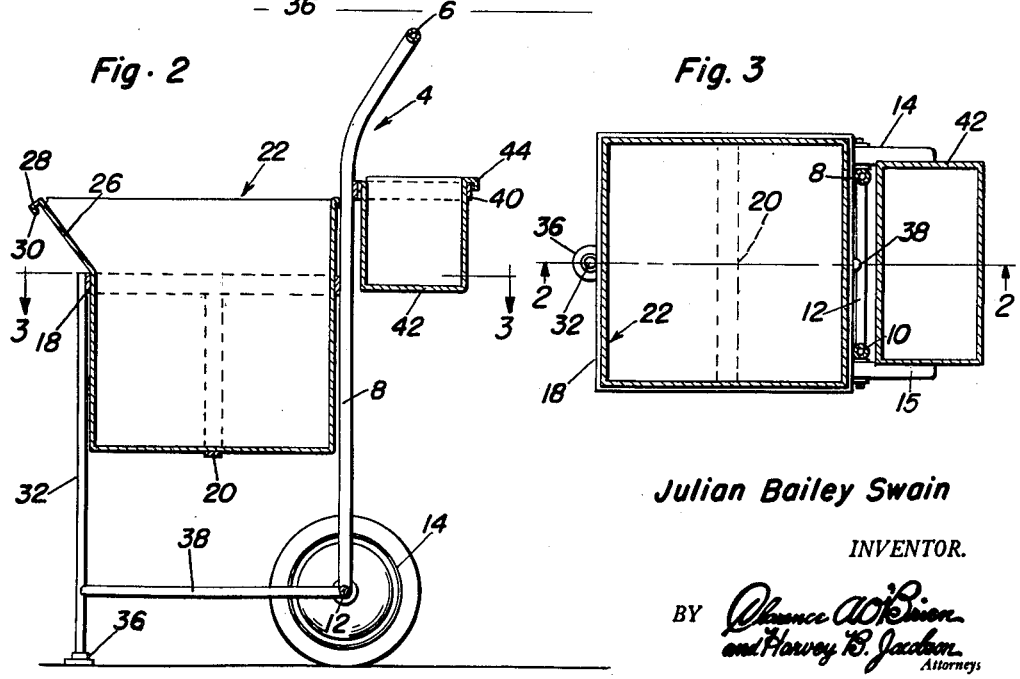
Figure 2 is a central vertical sectional view taken approximately on the plane of the line 2—2 of Figure 3; and, Figure 3 is a horizontal section on the plane of the section line 3—3 of Figure 2, looking in the direction of the arrows.

Referring now to the drawings by numerals and accompanying lead lines, consider first that the vehicle or mobile truck is characterized by an elongated U-shaped frame unit 4. This embodies a suitably offset bight portion 6 providing a hand grip and a pair of spaced parallel limbs 8 and 10 which are joined to a horizontal axle 12 carrying appropriate rubber tired wheels 14 and 16.

The frame unit 4 is provided on its forward side with a complemental frame structure 16 which is made up of flat metal strap members. Structure 16 is actually made up of a rectangular frame 18 and a depending stirrup 20. The parts 18 and 20 provide a simple but durable hanger for the insertable and removable clothes basket or container 22. This may be of cheap material, plastic or other light-weight nature. The receptacle portion 24 is primarily rectangular and is harnessed in the frame 18 and rests and is therefore saddled in the stirrup 20. The upper portion of the front wall, that is the portion 26, is flared to the approximate angle shown so as to provide a convenient chute which may be placed beneath the wringer of the washing machine (not shown) to facilitate feeding of the clothes direct from the wringer into the receptacle or basket. The upper wall portions of the receptacle are provided with outstanding marginal flanges 28 with downturned lip portions 30 which elements 28 and 30 not only serve to reinforce the wall constructions but provide convenient handles to facilitate catching hold of the receptacle and lifting it from its hanger or replacing it as the requirement is met.

The aforementioned prop is in the nature of a leg 32, which is centered in respect to the limbs 8 and 10 in advance of the limbs and the upper end portion and is rigidly secured at 34 to the frame 18. The lower end is provided with an appropriate foot 36 which rests on the floor. A horizontal brace 38 is joined with the lower end portion of the leg and with the center portion of the axle 12. Thus, a well-balanced rigid arrangement is provided for securing the frame units 4 and 16 together with requisite nicety. Then too, this arrangement permits the overall vehicle to set in an upright position for loading and unloading. The basket or receptacle 22 is supported at an elevation to permit the clothes to dump directly from the wringer into the receptacle. Also the latter is at a suitable elevation to serve the requirements of the laundress in removing the washed garments, etc. from the receptacle and hanging same on a clothesline in the yard or elsewhere.

A small rectangular flat metal frame 40 is secured across the rear side portions of the limbs 8 and 10 and this serves to accommodate an insertable and removable box or container 42 for clothespins (not shown). Here the overhanging flanges 44 serve not only for reinforcing purposes but also as hangers to support the receptacle in the frame and, in addition, they may be employed as handles in an obvious manner.

The over-all vehicle is comparatively light in weight, sturdy in construction, well balanced, easy to cart about and is steady when it is set up in the vertical position shown in the drawings for loading and unloading.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A laundry handling cart of the class shown and described comprising a horizontal axle, supporting wheels for the end portions of said axle, an elongated U-shaped frame unit embodying a bight portion providing a hand grip and limb portions, said limb portions being secured to and rising vertically, at right angles, from said axle, a relatively small rectangular frame secured to and projecting at right angles from said limbs, a larger rectangular frame also secured to said limbs, said larger frame being provided with depending stirrup means, a vertical prop forming leg secured at its upper end to said larger rectangular frame and provided at its bottom with a foot to rest on the floor or other supporting surface, and a brace secured to the lower end portion of said leg into the intermediate portion of said axle.

2. A laundry handling cart of the class shown and described comprising a wheel supported axle, a vertical U-shaped frame unit embodying limbs rigidly attached to said axle, a frame structure embodying a rectangular frame secured to said U-shaped frame unit at right angles to the latter and including a stirrup, a horizontal brace secured to and projecting forwardly from said axle in a plane beneath said stirrup, a vertical leg, said leg being secured at its upper end to a complemental portion of said rectangular frame and being provided at its bottom with a foot to rest on the floor or elsewhere, the forward end of said brace being connected to the lower end portion of said leg, said brace being in a plane with said axle, the bottom foot-equipped portion of said leg depending to a plane below said axle, the upper end of said leg terminating flush with the upper portion of said rectangular frame, and a second smaller rectangular frame secured to the rear side of the limbs of said U-shaped frame unit and extending at right angles from the latter and adapted to accommodate an insertable and removable clothespin receptacle and being on a plane above the first-named rectangular frame and on a plane below the upper end portion of said U-shaped frame unit.

JULIAN BAILEY SWAIN.

REFERENCES CITED

The following references are of record in the file of this patent:

UNITED STATES PATENTS

| Number | Name | Date |
| --- | --- | --- |
| 1,427,262 | Charriot | Aug. 29, 1922 |
| 1,752,687 | Newhouser | Apr. 1, 1930 |
| 2,037,291 | Waldmann | Apr. 14, 1936 |
| 2,415,334 | Brown | Feb. 4, 1937 |
| 2,497,240 | Sherer | Feb. 14, 1950 |
| 2,504,907 | Truran | Apr. 18, 1950 |